United States Patent [19]

Somerville et al.

[11] Patent Number: 5,718,735
[45] Date of Patent: Feb. 17, 1998

[54] METHOD OF PREPARING A HIGH HEATING VALUE FUEL PRODUCT

[75] Inventors: Robin B. Somerville, Beaumont, Tex.; Liang-tseng Fan, Manhattan, Kans.

[73] Assignee: Solidiwaste Technology, L.P., Manhattan, Kans.

[21] Appl. No.: 948,089

[22] Filed: Sep. 18, 1992

Related U.S. Application Data

[63] Continuation-in-part of Ser. No. 644,192, Jan. 22, 1991, abandoned.

[51] Int. Cl.$^6$ .................... C10L 5/00; C10L 5/46
[52] U.S. Cl. .................... 44/552; 44/589
[58] Field of Search .................... 44/550, 552, 589, 44/551

[56] References Cited

U.S. PATENT DOCUMENTS

| | | | |
|---|---|---|---|
| 851,407 | 4/1907 | Culver | 44/552 |
| 1,195,784 | 8/1916 | Culver | 44/552 |
| 1,572,909 | 2/1926 | von Porten | 44/552 |
| 1,966,598 | 7/1934 | von Turk Rohn | 44/552 |
| 4,875,905 | 10/1989 | Somerville et al. | 44/589 |

*Primary Examiner*—Prince Willis, Jr.
*Assistant Examiner*—Cephia D. Toomer
*Attorney, Agent, or Firm*—Harrison & Egbert

[57] ABSTRACT

A method of preparing a high heating value fuel product having the steps of blending a hydrocarbon-containing material with a dried sewage sludge, mixing a monomeric polyalcohol to the blend of the hydrocarbon-containing material and the dried sewage sludge, introducing a pozzolanic agent to the mixture, and forming the mixture into a form suitable for handling. The hydrocarbon-containing material is a waste material having a heating value of greater than 7,000 BTU. The monomeric polyalcohol is a chemical selected from the group of triethylene glycol, diethylene glycol, and glycerine propylene glycol. The pozzolantc agent is either lime fly ash, kiln dust, or other lime-containing product.

17 Claims, No Drawings

METHOD OF PREPARING A HIGH HEATING VALUE FUEL PRODUCT

RELATED APPLICATIONS

The present application is a continuation-in-part of U.S. patent application Ser. No. 07/644,192, filed on Jan. 22, 1991, now abandoned, and entitled "METHOD OF PREPARING A HIGH HEATING VALUE FUEL PRODUCT", presently pending.

TECHNICAL FIELD

The present invention relates to processes for the formation of fuel products. More particularly, the present invention relates to processes that utilize sewage sludge in combination with waste hydrocarbons for the purpose of producing a suitable fuel product.

BACKGROUND ART

Sewage systems are physical systems for the collection of waste water and its treatment before discharge back into the environment. Domestic waste water includes the used water of businesses and office buildings as well as dwellings. Industrial waste water is that waste which is discharged during industrial operations. In addition to waste water, sewage systems also handle the flow of storm water, either separately, or, more commonly, as part of a single system.

During the years 1912–1915, a process was developed that proved to be very effective in the removal of organic material from the waste water. It was determined that by releasing compressed air in a tank of waste water, a greater degree of control, and hence a greater degree of treatment, could be achieved. The circulation of some of the sludge gave a vast area for the biological action that was going on in a trickling filter, by combining the organisms carried by the sludge, oxygen supplied by the incoming air, and new food supplied by the settled waste water entering the aeration tanks. By varying the amount of air and the amount of sludge returned to the process, higher levels of treatment could be obtained. Because the sludge was teeming with bacterial and associated biological lives, the sludge was called "activated" and the process called the "activated-sludge process". This system proved to be highly efficient and was rapidly adopted by cities around the world for sewage treatment.

In typical waste disposal operations, the raw waste water enters the plant pumping station and is treated in the following steps: grit removal, preliminary sedimentation, aeration, and final sedimentation. In addition, chlorine treatment may be given the flow prior to preliminary sedimentation or it may be given to the final effluent. With the first application, the effect of chlorine is to minimize odors from the sedimentation tanks. When fed to the final effluent, chlorine serves as a disinfectant.

The purpose of the sedimentation tanks, both preliminary and final, is to separate solids from the waste water flow; the solids removed must be given further treatment. Solids are exposed to anaerobic digestion and dewatering on vacuum filters. The final product is a moist cake with approximately 70% water, suitable for land application as a soil conditioner. During the digestion of sludge, a gas consisting of approximately two-thirds methane is produced that is burned for heat for the plant buildings and to provide some power generation. This sludge gas has a heat value of about 600 BTU (British Thermal Units) per cubic foot.

Congress adopted the Clean Water Act of 1977 to "restore and maintain the chemical, physical and biological integrity of the Nation's waters". To achieve this goal, the Act prohibits the discharge of pollutants into navigable waters except in compliance with the statute. Congress recognized that the regulation of those discharging effluent directly into the Nation's waters alone would not be sufficient to achieve the Act's goals. Consequently, the Act requires the Environmental Protection Agency (EPA) to restrict pollutant discharges for those who discharge waste water indirectly through sewers flowing through publicly owned treatment works which receive waste water from industrial facilities, domestic wastes from private residences and runoff from various sources that must be treated prior to discharge by the treatment works. Treatment results in an effluent that may be discharged and sewage sludge. The treatment sludge, usually over 90% water, also contains solids and dissolved substances. The chemical composition and biological constituents of the sludge depend upon the composition of the waste water entering the treatment facilities and the subsequent treatment processes. Typically, these constituents may include volatiles, organic solids, nutrients, disease-causing pathogenic organisms, heavy metals and inorganic ions, and toxic organic chemicals from industrial wastes, household chemicals, and pesticides.

The Clean Water Act of 1977 amended the regulations which directed the EPA to develop regulations containing guidelines for the use and disposal of sewage sludge. The regulations were to identify uses for sewage sludge, including disposal, and factors to be taken into account in determining the measures and practices applicable to each use or disposal. In addition, the regulations were to specify concentrations of pollutants which would interfere with sewage sludge use or disposal. The Water Quality Act of 1987 included amendments that require the EPA to establish sludge use and disposal standards. These standards include management practices and numerical limitations for the toxic pollutants in sewage sludge identified by EPA that may adversely affect public health or the environment. The standards must be adequate to protect public health and the environment from any reasonably anticipated adverse effects of the pollutants.

During the National Sewage Sludge Survey, it was determined that there were six (6) primary use and disposal practices. The six (6) possible disposal practice categories include: (1) land application, (2) distribution and marketing; (3) incineration; (4) monofill; (5) co-disposal landfill; and (6) ocean disposal. As such, it has been an important consideration for the EPA to determine the proper disposal technique for sewage sludge. This is necessary to prevent harm to human health while encouraging the beneficial reuse of sewage sludge.

In a pilot study of the petrochemical industry, it was discovered that most of the hazardous and non-hazardous wastes produced contain high BTU values. Most of these wastes, however, are disposed in landfills or by incineration. The National Priorities List of Hazardous Waste Sites shows an abundance of sites with relatively high BTU value wastes. There is an increasing trend for many producers of high heating value wastes to resort to commercially operating cement and lime kilns for ultimate disposal of such wastes. The Environmental Protection Agency has already initiated a similar effort in the Fuels Project. This project currently disposes only of liquid wastes with a high BTU value. Presently, certain companies provide safe disposal service for combustible liquid waste producers.

Most cement kilns accepting these wastes can use only liquid fuels. The normal criterion for acceptance of waste is that the heating value of the waste exceeds 10,000 BTU per pound. Cement kilns come in four (4) basic configurations that represent an evolutionary scale toward increasing energy efficiency. The four (4) types are: wet process, long dry, preheater, and precalcinating. Although cement kilns function as excellent incinerators, such kilns burning hazardous wastes have emphasized the resource recovery nature and operate as industrial furnaces which burn waste for energy and resource recovery.

Cement kilns have huge appetites for fuel and raw materials. A relatively small wet process kiln, for example, may consume 43 tons dry weight of feed stock, 6,500 gallons of water, and 170,000,000 BTU to produce 30 tons per hour of clinker. Such apparent inefficiencies can lead to the demise of similar wet kilns in today's energy-conscious times. However, the liabilities of this old, wet process kiln can become assets when the kiln is used to co-process wastes. Cement kilns offer the tremendous advantage of being able to utilize many diverse types of wastes for their energy content and/or resource value. Cement kilns have been established as effective devices for energy recovery while burning liquid waste for fuel. Nevertheless, there are equally important opportunities for the utilization of other waste products.

In general, industrial wastes contain numerous inorganics, but are low in organics. These are introduced into the cool end of the kiln as components of the slurry. Many metal bearing wastes are also compatible with cement making. Iron and aluminum are normal cement constituents, but other heavy metals also will became bound in the crystalline structure of the clinker. Lead and zinc are eliminated mainly in dust as opposed to clinker when the kiln is filled with halogenated fuels. Halogens can have positive influences in the kiln by removing sodium and potassium, for example. This occurs because the alkaline salts have boiling points lower than the temperature in the burning zone of the kiln.

The volatile potassium and sodium salts are condensed in the air stream in cooler regions of the kiln and is removed as kiln dust. Fluoride may enter into the clinkering reaction as a flux and thus serves as a burning aid.

In the past, it has been very difficult to utilize waste solids in cement kilns. Kilns that have tried to burn these wastes have encountered problems with the handling and the feeding of the kilns. It is especially difficult when the solids or sludge contains a high level of organic and hazardous constituents in the wastes. In such situations, the natural vapor emission from the organic and hazardous constituents would prevent their use in the cement kiln. It becomes very difficult to control the migration of pollutants from the fuel product.

U.S. Pat. No. 4,875,905 was issued on Oct. 24, 1989 to the present inventors. In this patent, a technique and method were developed so as to provide a process for the manufacturer which allows high BTU waste products to be utilized as a fuel product. This method comprised the steps of blending a high heating value sludge material with a cellulostc material, introducing a pozzolanic agent to the blended mixture for controlling the rate of solidification, and forming the blended mixture into a form suitable for handling. In this method, the sludge was a hydrocarbon-containing material having a heating value of greater than 7,000 BTU. The sludge, identified in this patent, included a complex mixture of organic hazardous waste streams. The cellulosic material is a silica-containing particulate material having a high heating value. A microencapsulating reagent was employed that included a chemical selected from the group of ethylene glycol, triethylene glycol, diethylene glycol, and glycerine end propylene glycol. In addition, a calcium chloride solution was also included within this microencapsulation reagent. The pozzolanic agent was added to the mixture at a constant rate so as to control the solidification of the end product. The step of forming includes extruding the blended mixture into a plurality of pellets.

It is an object of the present invention to provide a process for the manufacture of a fuel product that allows for the disposal of sewage sludge while producing a high BTU fuel product.

It is another object of the present invention that allows domestic sewage sludge to be utilized for the purpose of obtaining the heating value from the sewage sludge.

It is another object of the present invention to provide a process that allows commercially operating kilns to receive hazardous and non-hazardous sludge and waste in solid form.

It is a further object of the present invention to provide a process that utilizes sludge and waste hydrocarbons for producing a useful fuel product.

These and other objects and advantages of the present invention will become apparent from a reading of the attached specification and appended claims.

SUMMARY OF THE INVENTION

The present invention is a method of preparing a high heating value fuel product that comprises the steps of: (1) removing dried sewage sludge from a secondary treatment system of a sewage processing plant; (2) blending a hydrocarbon-containing material with the dried sewage sludge; (3) mixing a pelletizing reagent comprising monomeric polyalcohol or waste containing it, e.g. spent anti-freeze, to the blend of the hydrocarbon-containing material and the dried sewage sludge; (4) introducing a pozzolanic agent to the mixture; and (5) forming the mixture into a form suitable for handling.

The hydrocarbon-containing material is of a type having a heating value of greater than 7,000 BTU. Specifically, this hydrocarbon-containing material is an oil-containing waste material. The dried sewage sludge is a domestic sewage sludge. The sewage sludge is blended with the hydrocarbon-containing material in an amount between 10 and 50% of the weight of the hydrocarbon-containing material.

The monomeric polyalcohol is a chemical selected from the group consisting of ethylene glycol, diethylene glycol, triethylene glycol, glycerine propylene, and glycol. The monomeric polyalcohol is mixed with the blend of the hydrocarbon-containing material and the dried sewage sludge in an amount generally equal to approximately 2% of the weight of the blend. The step of mixing further comprises the step of mixing an organic reagent to the blended mixture of the hydrocarbon-containing material. This organic reagent includes the monomeric polyalcohol or waste containing it. In particular, this organic reagent has a 4 to 15 weight percent of a chemical selected from the group consisting of ethylene glycol, diethylene glycol, triethylene glycol, glycerine, propylene glycol, and a waste material containing one or more of these chemicals, e.g., spent anti-freeze. This organic reagent also includes a 20 to 32 weight percent of calcium chloride solution.

The pozzolanic agent is introduced to the mixture at a controlled rate. The pozzolanic agent is lime, fly ash, kiln dust or other lime-containing material. The pozzolanic material has a weight of approximately 5% of the weight of the mixture. The step of forming comprises extruding, pressure molding, or agglomerating the mixture into a plurality of pellets. Each of the plurality of pellets is then coated with a pozzolanic coating, if necessary. Finally, the pellets are cured to a desired strength.

The material resulting from this process is a high heating value fuel product that can be utilized in cement kilns, or other operations, requiring fuel. In addition, the sewage sludge is properly disposed of. Any hydrocarbon-containing waste is similarly disposed of through the combustion process in a clean and efficient manner.

DETAILED DESCRIPTION OF THE INVENTION

The present invention is a method of preparing a fuel product that comprises the basic steps of: (1) removing dried sewage sludge from a secondary treatment system of a sewage processing plant; (2) blending a hydrocarbon-containing material with a dried sewage sludge; (3) mixing pelletizing reagent comprising a monomeric polyalcohol or a waste material containing it to the blend of the hydrocarbon-containing material and the dried sewage sludge; (4) introducing a pozzolanic agent to the mixture; and (5) forming the mixture into a form suitable for handling.

The purpose of this process is to combine the benefits of various hazardous and waste material so as to produce an acceptable supplemental fuel for coal piles. In particular, the present invention permits some liquids and sludges heretofore unusable under EPA requirements to be employed in cement kilns or similar facilities. This process provides a proper disposal of sewage sludge in accordance with recent EPA recommendations.

The method of the present invention involves blending the high heating value hydrocarbon-containing material with a dried sewage sludge. The high heating value hydrocarbon-containing material may be a waste material such as API separator wastes, tank bottoms, or wastes which are designated by the EPA as KO48 through KO52. These waste materials may be solids (sludges), liquids, or a mixture of both. An example of a suitable sludge is found in oil tank bottoms. Typical oil tank bottoms contain 10% to 20% crude product and 80% to 90% sludge. Also activated carbon particles or ion exchange resins functioning as scrubbers and cannisters in columns may be used as a high heating value hydrocarbon-containing material. A wide variety of other high heating value wastes exists and can be used in the present invention. The major purpose of the present invention is to allow a high heating value waste material that would otherwise be unusable to be utilized as a fuel supplement and as a partial replacement for coal and related fuels.

This high heating value waste material should be a material having a heating value of greater than 7,000 BTU per pound. It is believed that the economics of the waste material and its use in the present invention are significantly reduced when the heating value of the waste falls below 7,000 BTUs. In particular, the present invention is highly effective when the material is a mixture of organic hazardous waste streams.

This high heating value waste material is mechanically blended with a sewage sludge. Ideally, the sewage sludge should be dried so as to facilitate the mixing and use of the mixture. This dried sewage sludge is from the secondary treatment of an activated sludge system at a municipal sewage plant. In the secondary treatment sludge, the bacteria in the sludge is killed. For the most part, domestic rather than industrial sewage sludge is relied upon. After experimentation, it has been found that dried sewage sludge has a BTU value of up to 7,800. As such, this makes an ideal product for mixing with the hydrocarbon-containing material. Typically, the dried sewage sludge is obtained from the primary or secondary digester in a sewage plant. At this stage in the sewage treatment process, the bacteria in the sludge have been killed. The wet sludge is then dried by sitting in the open air, by air dryers, or other means. Since the product of the present invention must be suitable for handling, it is important to effectively utilize bacteria-less sludge that has been treated.

As the sewage sludge and the high heating value hydrocarbon-containing waste material are mechanically blended, it is preferable to introduce a pelletizing reagent, i.e., a monomeric polyalcohol or waste material containing it to the blended mixture. Acting as a binder, the monomeric polyalcohol serves to promote pelletizing the blended mixture by extruding, pressure molding, agglomerating or any other similar means. This monomeric polyalcohol also reduces emissions of vapors and some of the organic and hazardous constituents in the waste. The pelletizing reagent, i.e., the monomeric polyalcohol, may be ethylene glycol, diethylene glycol, triethylene glycol, glycerine or propylene glycol or a waste containing it, e.g. spent anti-freeze.

Alternatively, the mixture of the dried sewage sludge and the high heating value hydrocarbon-containing waste material are blended with a microencapsulating reagent. The 1–15 weight percent of a pelletizing reagent, i.e., a monomeric polyalcohol selected from the group consisting of ethylene glycol, diethylene glycol, triethylene glycol, glycerine, or propylene glycol or a waste material containing it, e.g. spent anti-freeze.

A pozzolanic agent is added to the blended mixture of the dried sewage sludge, a hydrocarbon-containing waste material, and monomeric polyalcohol so as to control the rate of solidification of the mixture. The pozzolanic agent may be lime, fly ash, kiln dust, or any other lime-rich pozzolanic substance. One additional benefit of the lime material is that it acts as a sulphur scrubber. Lime or lime-rich fly ash also has the capabilities to chemically absorb any heavy metals that might be in either the hydrocarbon-containing sludge or the sewage sludge. After the lime-containing pozzolanic agent is introduced to the mixture, the mixture is passed from the mechanical blender.

The resultant blend can be pelletized and allowed to cure for transportation to the end user. Typically, the pellets are formed by pressure forming or agglomerating, if necessary, when the wastes are viscid. The pellets can be given a final coating of a pozzolan so as to retain the full BTU values of the newly constructed fuel supplement. This coating also prevents the pellets from adhering to each other during the curing cycle. The final step to this process is to cure the pellets so that they reach the strength of between fifty and one hundred pounds per square inch. After curing the pellets are ready for safe truck transportation to a kiln or power plant.

Under the present law, it is important that pollutants cannot migrate from the product. By blending the pelletizing reagent and/or pozzolanic agent with the mixture, and by adding the final pozzolanic coating, vapor release is prevented even in hot weather and during extended storage. As a result, the material can be stored outdoors subject to nature's elements.

In the inventors' laboratory, a sample of oil tank bottoms containing 10% to 20% crude with 80% to 90% oil saturated silica sludge was shown to have BTU value of 7,200 to 9,800. The oil product tested at 8,700 to 9,200 BTU and the sludge tested at 7,200 to 7,900 BTU. This waste (amounting to 73% by weight of the total mix design) was blended with dried sewage sludge (amounting to 20% of the total mix design by weight) with glycol or glycerine (amounting to 5% by weight), the resultant BTU value was in the range of 7,000 to 9,000. In addition, both the oily wastes and the sewage sludge was properly disposed of by burning. The lime-containing material effectively serve to scrub the sulphur from the burned mixture. It also serves to chemically absorb certain heavy metals that were in either the oily waste or the sewage sludge.

In another experiment, motor oil with a BTU value of 18,000 was used. This was blended with 30% sewage sludge and 5% lime. Two percent glycol or glycerine was added to the mixture. The end result was a material with a BTU value of 14,000. As can be seen, the mixture of the oily waste with the dried sewage sludge produces a fuel product with a very high BTU value. Any BTU value of over 7,000 is extremely desirable as a fuel product.

The pelletization or solidification and pelletization of this material produces an ideal Fuels Program product. Initially, the hydrocarbon-containing material used was a hazardous waste and would have to be disposed of by conventional, and perhaps unsatisfactory, techniques. Also, the otherwise undesirable dried sewage sludge was mixed with the hydrocarbon-containing material. Under law, the sewage sludge would have to be disposed of in a controlled manner. Typically, the sewage sludge would be disposed of in an unproductive and inefficient manner.

By the process of the present invention, this hazardous waste is now converted to a form which prevents the migration of pollutants. These pellets can be added to the coal fuel supply without concern for deterioration by weather. The blending with the glycerine and glycol, and the final pozzolanic coating prevent vapor release even in the hottest weather or during extended storage.

In terms of the consumption by customers, the product is an ideal fuel supplement. The BTU value of the pellets is stable and predictable. These pellets can be handled with the same material handling equipment used for the raw feed stock without modification. The pellets are economical and will contain the very silica which the kiln normally must purchase as a necessary ingredient for their product. As such, the method of the present invention allows a use of hazardous waste materials in an ongoing commercial operation. The present invention serves to significantly reduce the cost of fuel for cement kilns and other operations. In addition, it serves to alleviate an otherwise difficult hazardous waste disposal problem by effectively and efficiently utilizing the hydrocarbon-containing waste and the dried sewage sludge.

One other benefit is that the material can be transported in pneumatic trailers and off-loaded into silos. This effectively keeps everything in a closed loop system totally avoiding any potential release or spills should regulations demand.

The foregoing disclosure and description of the invention is illustrative and explanatory thereof. Various changes in the details of the composition of the present invention, and in the details of the process of the present invention, may be made within the scope of the appended claims without departing from the true spirit of the invention. The present invention should only be limited by the following claims and their legal equivalents.

We claim:

1. A method of preparing a high heating value fuel product comprising the steps of:

removing dried sewage sludge from a secondary treatment system of a sewage processing plant;

blending a hydrocarbon-containing material with said dried sewage sludge, said hydrocarbon-containing material having a heating value of greater than 7,000 BTU, said sewage sludge being between 10 and 50% of a weight of said hydrocarbon-containing material;

mixing a monomeric polyalcohol to the blend of said hydrocarbon-containing material and said dried sewage sludge;

introducing a lime-containing pozzolanic agent to the mixture of said monomeric polyalcohol, said hydrocarbon-containing material, and said dried sewage sludge; and forming the mixture of said pozzolanic agent, said monomeric polyalcohol, said hydrocarbon-containing material, and said dried sewage sludge into a form suitable for handling.

2. The method of claim 1, said hydrocarbon-containing material being an oil-containing waste material.

3. The method of claim 1, said dried sewage sludge comprising a domestic sewage sludge.

4. The method of claim 1, said sewage sludge blended with said hydrocarbon-containing material in an amount between 25 to 50% of the weight of the hydrocarbon-containing material.

5. The method of claim 1, said monomeric polyalcohol being a chemical selected from the group consisting of: triethylene glycol, diethylene glycol, ethylene glycol, glycerine, and propylene glycol.

6. The method of claim 5, said monomeric polyalcohol mixed with the blend of said hydrocarbon-containing material and said dried sewage sludge in an amount generally equal to approximately 2% of the weight of the blend.

7. The method of claim 1, said step of mixing comprising:

mixing an organic reagent to the blended mixture of said hydrocarbon-containing material and said dried sewage sludge, said organic reagent being a mixture having a 1–15 weight percent of a chemical selected from the group consisting of: triethylene glycol, diethylene glycol, ethylene glycol, glycerine, and propylene glycol.

8. The method of claim 1, said step of introducing said pozzolanic agent comprising:

introducing said pozzolanic agent to the mixture at a controlled rate.

9. The method of claim 8, said pozzolanic agent being a substance selected from the group consisting of: lime, fly ash and kiln dust.

10. The method of claim 9, said pozzolanic agent having a weight of approximately 5% of the weight of said mixture.

11. The method of claim 1, said step of forming comprising:

extruding said mixture into a plurality of pellets.

12. The method of claim 11, further comprising the steps of:

coating said plurality of pellets with a pozzolanic coating; and curing said pellets to a desired strength.

13. A method of preparing a high heating value fuel product comprising the steps of:

blending a high heating value waste material with a sewage sludge, said waste material having a hydrocarbon-containing material having a heating value of greater than 7000 BTU, said sewage sludge being between 10 and 50% of a weight of said waste material, said sewage sludge being a product of a secondary treatment system of a sewage processing plant;

adding a lime-containing substance to the blend of said waste material and said sewage sludge; and forming the blended mixture into a form suitable for handling.

14. The method of claim 13, further comprising the step of:

introducing a pelletizing agent containing a monomeric polyalcohol to the blended mixture of said waste material, said sewage sludge, and said lime-containing substance prior to the step of forming.

15. The method of claim 14, said lime-containing substance comprising fly ash, and said sewage sludge comprising dried sewage sludge.

16. The method of claim 14, said monomeric polyalcohol having a chemical selected from the group consisting of: triethylene glycol, diethylene glycol, ethylene glycol, glycerine, and propylene glycol.

17. A method of preparing a high heating value fuel product comprising the steps of:

blending a high heating value waste material with a sewage sludge, said waste material having a hydrocarbon-containing material having a heating value of greater than 7000 BTU, said sewage sludge being between 10 and 50% of a weight of said waste material, said sewage sludge being a product of a secondary treatment system of a sewage processing plant;

mixing a monomeric polyalcohol to the blended mixture of said waste material and said sewage sludge, said pelletizing reagent being a mixture having a chemical selected from the group consisting of: triethylene glycol, diethylene glycol, and glycerine, ethylene glycol, and propylene glycol;

introducing a pozzolanic agent to the blended mixture; and forming the blended mixture into a form suitable for handling.

* * * * *